(12) United States Patent
Kim et al.

(10) Patent No.: US 11,507,648 B2
(45) Date of Patent: Nov. 22, 2022

(54) ELECTRIC DEVICE AND CONTROL METHOD THEREOF

(71) Applicant: LG ELECTRONICS INC., Seoul (KR)

(72) Inventors: Kokeun Kim, Seoul (KR); Sooyoung Sim, Seoul (KR); Beomoh Kim, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 602 days.

(21) Appl. No.: 16/488,928

(22) PCT Filed: Mar. 26, 2019

(86) PCT No.: PCT/KR2019/003517
§ 371 (c)(1),
(2) Date: Aug. 26, 2019

(87) PCT Pub. No.: WO2020/196944
PCT Pub. Date: Oct. 1, 2020

(65) Prior Publication Data
US 2020/0311236 A1 Oct. 1, 2020

(51) Int. Cl.
*G06F 21/32* (2013.01)
(52) U.S. Cl.
CPC ...... *G06F 21/32* (2013.01); *G06F 2221/2105* (2013.01)
(58) Field of Classification Search
CPC ..... G06F 2221/2105; G06F 2221/2113; G06F 21/32; G06F 21/45; H04L 2463/082
See application file for complete search history.

(56) References Cited

U.S. PATENT DOCUMENTS

| 10,235,344 B2 * | 3/2019 | Moutafis | G06V 40/172 |
| 2004/0010697 A1 * | 1/2004 | White | G06F 21/31 |
| | | | 713/186 |

(Continued)

FOREIGN PATENT DOCUMENTS

| KR | 1020130097581 | 9/2013 |
| KR | 1020160078208 | 7/2016 |
| WO | 2006055575 | 5/2006 |

OTHER PUBLICATIONS

PCT International Application No. PCT/KR2019/003517, Notification of Transmittal of The International Search Report and the Written Opinion of the International Searching Authority, or Declaration dated Dec. 12, 2019, 10 pages.

*Primary Examiner* — Eric W Shepperd
(74) *Attorney, Agent, or Firm* — Lee, Hong, Degerman, Kang & Waimey

(57) ABSTRACT

An electronic device according to an embodiment includes a first biometric sensor to detect first biometric information, a second biometric sensor to detect second biometric information, a security module to normalize a first decision score for the first biometric information and a second decision score for the second biometric information, generate a decision function model for combined matching of the normalized first and second decision scores, set a threshold score corresponding to a sensitivity level in the decision function model, and perform user authentication for the first and second biometric information based on the decision function model to which the threshold score is applied, and a controller configured to control an operation of the electronic device based on a result of the user authentication performed by the security module. According to the present invention, the electronic device may perform user authentication by an Internet of Things (IoT).

13 Claims, 14 Drawing Sheets

[POSITIVE BASIS]

(56) References Cited

U.S. PATENT DOCUMENTS

| | | | |
|---|---|---|---|
| 2004/0243567 A1* | 12/2004 | Levy | G06F 16/258 |
| 2010/0162386 A1* | 6/2010 | Li | G06F 21/32 |
| | | | 726/19 |
| 2013/0236066 A1* | 9/2013 | Shubinsky | H04N 5/33 |
| | | | 382/115 |
| 2013/0290136 A1 | 10/2013 | Sheets et al. | |
| 2014/0064575 A1* | 3/2014 | Flom | G06V 40/70 |
| | | | 382/116 |
| 2016/0292536 A1* | 10/2016 | Irie | G06F 21/32 |
| 2017/0366543 A1 | 12/2017 | Wang et al. | |
| 2018/0004924 A1* | 1/2018 | Tieu | G06F 21/6218 |
| 2019/0080065 A1* | 3/2019 | Sheik-Nainar | G06V 40/40 |
| 2019/0122024 A1* | 4/2019 | Schwartz | G06V 40/50 |

* cited by examiner

[POSITIVE BASIS]

ELECTRIC DEVICE AND CONTROL METHOD THEREOF

CROSS-REFERENCE TO RELATED APPLICATIONS

This application is the National Stage filing under 35 U.S.C. 371 of International Application No. PCT/KR2019/003517, filed on Mar. 26, 2019, the contents of which are hereby incorporated by reference herein in its entirety.

FIELD

The present disclosure relates to an electric device capable of performing multimodal biometric authentication.

BACKGROUND

With development of technologies, the functions of electronic devices are diversified. Examples of such functions include data and voice communications, capturing images and video via a camera, recording audio, playing music files via a speaker system, and displaying images and video on a display unit. Some electronic devices include additional functionality which supports electronic game playing or perform multimedia player functions. Specifically, the recent electronic devices may receive broadcast and multicast signals providing visual contents such as videos or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

A broadened range of functions of the electronic device increases the importance of user authentication for enhancing security. For user authentication, various schemes may be used such as a password scheme, a pattern scheme, and a biometric authentication scheme.

Biometrics is a type of security authentication, and is a technology of performing user authentication using peculiar physical features of fingerprint, face, voice, iris, retina, blood vessel, etc. This biometric recognition technology reduces the risk of illegal use or reproduction and increases the convenience in use.

In recent years, in order to enhance security, a unimodal biometric authentication technology in which biometric authentication is performed using single biometric information is being developed to a multimodal biometric authentication technology or a complex biometric authentication technology in which biometric authentication is performed using a plurality of pieces of biometric information.

Meanwhile, in implementing the multimodal biometric authentication technology, learning is performed for final decision, and a reference value is determined. To do this, it is necessary to collect a large volume of data, which is costly.

DISCLOSURE

Technical Problem

Therefore, one aspect of the present disclosure is to provide an electronic device, capable of making decisions based on a multimodal biometric sensor that does not require learning, and a method of controlling the same.

Another aspect of the present disclosure is to provide an electronic device, which does not have to collect a large amount of data for learning, in order to determine a reference value for multimodal (or complex) biometric authentication, and can reduce a cost without causing a difference in performance from a case of performing learning, and a method of controlling the same.

Still another aspect of the present disclosure is to provide an electronic device, capable of quickly reflecting biometric information to a final decision, by using a normalized value of such biometric information acquired by an additional sensor even if another biometric sensor is added, and a method of controlling the same.

Technical Solution

To achieve those aspects and other advantages according to the present disclosure, there is provided an electronic device for performing multimodal biometric authentication, the device including a first biometric sensor configured to detect first biometric information, a second biometric sensor configured to detect second biometric information, a security module configured to normalize a first decision score for the first biometric information and a second decision score for the second biometric information, generate a decision function model for combined matching of the normalized first and second decision scores, set a threshold score corresponding to a sensitivity level in the decision function model, and perform user authentication for the first and second biometric information based on the decision function model to which the threshold score is applied, and a controller configured to control an operation of the electronic device based on a result of the user authentication performed by the security module, wherein the threshold score varies depending on a change of the sensitivity level.

In one embodiment, the normalization of the first and second decision scores may be performed on the basis of positive data and have a fixed false negative rate (FNR) in response to the generation of the decision function model.

In one embodiment, the security module may select the sensitivity level by controlling the fixed false negative rate (FNR) and decide a parameter corresponding to the selected sensitivity level as the threshold score of the decision function model, at the time of the user authentication.

In one embodiment, the security module may store parameters of threshold scores for each of sensitivity levels selected from the fixed false negative rate (FNR), and extract a parameter corresponding to a specific sensitivity level from the stored parameters to apply the extracted parameter as a threshold score, at the time of the user authentication.

In one embodiment, the decision function model may be a model for deciding a threshold score to determine whether or not the combined matching result of the first and second biometric information acquired for the user authentication is a genuine user, and the threshold score may be changed according to a sensitivity level selected from the decision function model. Also, a parameter for deciding the threshold score may be actively varied depending on cumulative information of the first and second biometric information.

In one embodiment, a parameter value that matches the threshold score may be increased when the sensitivity level is increased.

According to another aspect of the present disclosure according to an embodiment, there is provided an electronic device for performing multimodal biometric authentication, the device including a first biometric sensor configured to detect first biometric information, a second biometric sensor configured to detect second biometric information, a security module configured to normalize a first decision score for the first biometric information and a second decision score for the second biometric information on the basis of negative data, generate a decision function model for combined matching of the normalized first and second decision scores, set a threshold score corresponding to a specificity level in the decision function model, and perform user authentication for the first and second biometric information based on the decision function model to which the threshold score is applied, and a controller configured to control an operation of the electronic device based on a result of the user authentication performed by the security module, wherein the threshold score varies depending on a change of the specificity level.

In one embodiment, a fixed false positive rate (FPR) may be output in response to the generation of the decision function model, and the security module may select a specificity level by controlling the false positive rate (FPR) and decide a parameter corresponding to the selected specificity level as the threshold score of the decision function model, at the time of the user authentication.

In one embodiment, the security module may store parameters of threshold scores for each sensitivity level, selected from the fixed false positive rate (FPR), and extract a parameter value corresponding to a specific specificity level from the stored parameters to apply the extracted parameter as a threshold score, at the time of the user authentication.

In one embodiment, the decision function model may be a model for deciding a threshold score to determine whether or not a result of the combined matching of the first and second biometric information acquired for the user authentication is an impostor user, and the threshold score may be changed according to a specificity level selected from the decision function model. Also, a parameter for deciding the threshold score may be actively varied depending on cumulative information of the first and second biometric information.

In one embodiment, the security module may normalize a third decision score for third biometric information on the basis of the negative data when a third biometric sensor to detect the third biometric information is added, and the normalized third decision score may be combined with the decision function model for the combined matching of the normalized first and second decision scores, and then applied.

To achieve those aspects and other advantages of the present disclosure, there is provided a method for operating an electronic device that performs multimodal biometric authentication, the method including normalizing a first decision score for first biometric information acquired by a first biometric sensor on the basis of positive data. normalizing a second decision score for second biometric information acquired by a second biometric sensor on the basis of the positive data, generating a decision function model for combined matching of the first and second decision scores normalized based on the positive data, and setting a threshold score by controlling a fixed false negative rate (FNR) in the decision function model, and performing user authentication for the first and second biometric information based on the decision function model to which the set threshold score is applied.

In one embodiment, the method may further include evaluating performance of the user authentication by applying a threshold score varied depending on the control of the false negative rate (FNR).

In one embodiment, the normalizing on the basis of the positive data may be configured to perform the normalization by applying a generalized extreme value (GEV) parameter and a Gaussian distribution to the positive data.

Advantageous Effects

An electronic device according to the present disclosure can normalize each decision score of a multimodal biometric sensor on the basis of positive or negative data, thereby deciding a threshold score of a decision function according to sensitivity/specificity. That is, decision based on the multimodal biometric sensor can be made, even without learning.

In addition, the process of collecting a large amount of data for learning at once in order to decide a reference value for the multimodal biometric authentication is eliminated, thereby reducing a cost. This may result in further enhancement of usability.

Also, according to the present disclosure, even if another biometric sensor is added, biometric information acquired by the added sensor can be normalized and fast reflected to a final decision.

In addition, since the desired performance can be evaluated in terms of fixed sensitivity/specificity at the time of the multimodal biometric authentication, trade-off can be facilitated.

MODES OF CARRYING OUT PREFERRED EMBODIMENTS

Figure 1:
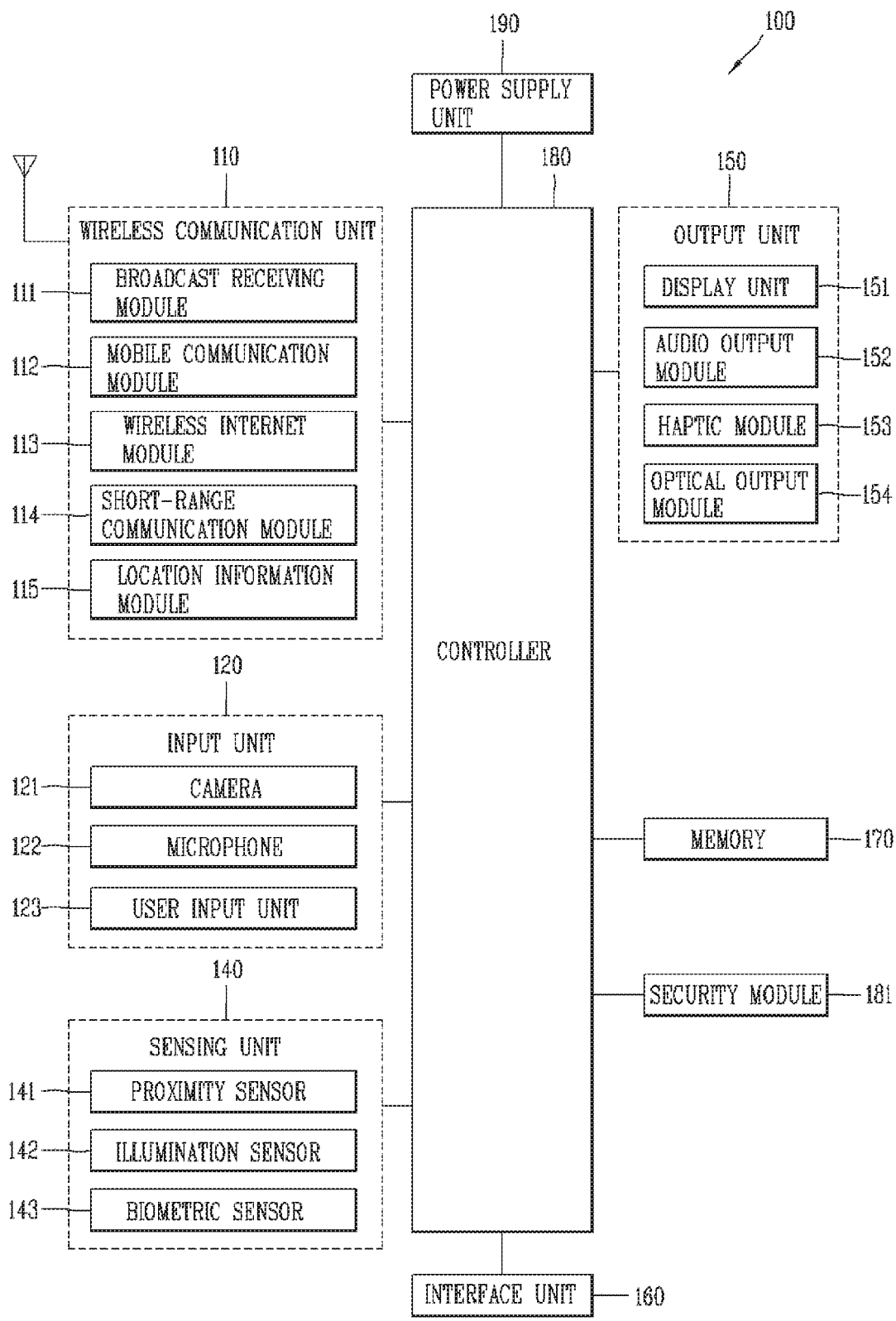
FIG. 1 is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcast terminals, personal digital assistants (PDAs), portable multimedia players (PMPs), navigators, slate portable computers (PCs), tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital television (DTV), desktop computers, and the like.

FIG. 1 is a block diagram of an electronic device in accordance with the present disclosure.

Referring to FIG. 1, the electronic device may be shown having components such as a wireless communication unit 110, an input unit 120, a sensing unit 140, an output unit 150, an interface unit 160, a memory 170, a controller 180, a security module 181, a power supply unit 190, and the like. It is understood that implementing all of the illustrated components is not a requirement. Greater or fewer components may alternatively be implemented.

In more detail, among others, a wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The biometric sensor 143 may include an iris sensor, a facial recognition sensor, a photoplethysmography (PPG) sensor, a voice sensor, and the like. The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Hereinafter, description will be given in more detail of the aforementioned components with reference to FIG. 1, prior to describing various embodiments implemented through the electronic device 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Here, another electronic device (which may be configured similarly to the electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of at least part of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the electronic device. The location information module 115 is a module used for acquiring the position (or the current position) of the electronic device and may not be limited to a module for directly calculating or acquiring the position of the electronic device.

Next, the input unit 120 is configured to permit various types of inputs to the electronic device 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the electronic device 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the electronic device 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the electronic device 100. The user input unit 123 may include one or more of a mechanical input element (for example, a mechanical key, a button located on a front and/or rear surface or a side surface of the electronic device 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like, and generate a corresponding sensing signal. The controller 180 generally cooperates with the sensing unit 140 to control operations of the electronic device 100 or execute data processing, a function or an operation associated with an application program installed in the electronic device 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the electronic device 100 to execute different operations or process different data (or information) according to whether a touch with respect to the same point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (Charge Couple Device (CCD), Complementary Metal Oxide Semiconductor (CMOS), etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 may output a signal for indicating an event generation using light of a light source of the electronic device 100. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for every external device to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device 100 therethrough. Various command signals or power input from the cradle may operate as signals for recognizing that the electronic device 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control operations relating to application programs and the general operations of the electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the electronic device 100 according to the present disclosure.

The security module 181 controls security related operations during operation of the electronic device. For example, when the biometric authentication function (or biometric function) is executed, the security module 181 may perform control related to biometric authentication. For example, the security module 181 may perform biometric authentication using an artificial neural network algorithm or an Support Vector Machine (SVM) algorithm, which is an algorithm for biometric authentication. In addition, the security module 181 may include biometric authentication algorithms, such as Fuzzy logic, Dempster-Shafer theory, SVM, Relevance Vector Machine (RVM) Mean Rule, Monte Carlo approach, Phase Stretch Transform (PST), Neural network, Principal Component Analysis, Fisherfaces, Wavelet and Elastic Matching, and the like.

The security module 181 may perform data transmission and reception with the controller 180 through communication, so as to control the overall operation of the electronic device. For example, the controller 180 may receive user authentication result data from the security module 181 and control the operation of the electronic device based on the received data. In addition, the security module 181 may receive a control command for performing biometric authentication from the controller 180, and perform biometric authentication accordingly.

On the other hand, in FIG. 1, the security module 181 and the controller 180 are shown as being separate components. However, the present disclosure is not limited thereto, and the security module 181 may be configured as one component of the controller 180.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
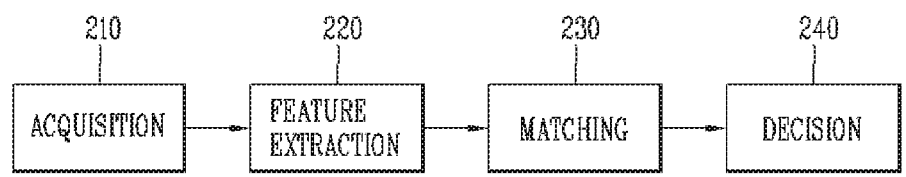
FIG. 2 is a conceptual view illustrating a unimodal biometric authentication method.

Hereinafter, a method of performing biometric authentication in the electronic device described in FIG. 1 will be described in detail. FIG. 2 is a conceptual view illustrating a unimodal biometric authentication scheme.

Referring to FIG. 2, unimodal biometric authentication may include an acquisition step 210, a feature extraction step 220, a matching step 230 and a decision step 240.

In the acquisition step 210, biometric recognition information is acquired through a biometric sensor. Pieces of biometric recognition information include pieces of user-specific biometric information such as fingerprint, face, voice, vein, iris, and the like.

In the feature extraction step 220, features of the biometric recognition information are extracted. The feature is information for recognizing a specific characteristic that varies from one person to another. For example, in the case of the fingerprint, a specific pattern of a fingerprint is set as a feature. This feature is differently set depending on biometric authentication schemes.

In the matching step 230, a matching score between preregistered user information and detected biometric recognition information may be calculated. The preregistered user information is biometric information that is stored in advance by the user before performing the biometric authentication. The user stores in advance the fingerprint information, the facial information, the voice information, the vein information, the iris information, and so on in the form of template in the memory 170.

The matching score refers to a score indicating similarity between the preregistered user information and the biometric recognition information. Various algorithms that are known in the related art may be used as algorithms for calculating the matching score.

In the decision step 240, the user authentication may be performed using the matching score and a decision function. The decision function is a function that serves as a reference for determining whether or not the user who inputs the biometric recognition information is a genuine user or an imposter user. The decision function may be set as a specific threshold or may be set as a multi-dimensional function.

An initial setting value (default value) may be set, by a manufacturer of a biometric authentication function, for the decision function. In addition, the initial setting value for the decision function may be changed using user's pieces of biometric recognition information, which are detected through biometric sensors. Therefore, the more the electronic device performs biometric recognition operation, the more the speed and the precision of the biometric recognition are improved.

In addition, decision functions may be generated differently from each other according to pieces of information that are used for generating the decision functions. Then, multiple decision functions that are generated differently from each other may be stored in the memory 170. For example, a decision function may be generated with only the matching score or may be generated using the matching score and a spoofing score. In this case, two decision functions may be both stored in the memory 170, and, whenever necessary, the biometric authentication may be performed using one of the two decision functions.

The unimodal biometric authentication scheme has been described above. A multimodal biometric authentication scheme will be described below. FIGS. 3A to 3D are conceptual views illustrating a multimodal biometric authentication scheme.

Multimodal biometric authentication may be categorized into 4 types according to when multiple pieces of biometric recognition information are fused. The term fusion is used to mean an operation of combing multiple pieces of information into one piece of information according to a preset algorithm and may be used interchangeably with the terms combination, integration, fusion, matching, and so on.

Figure 3A:
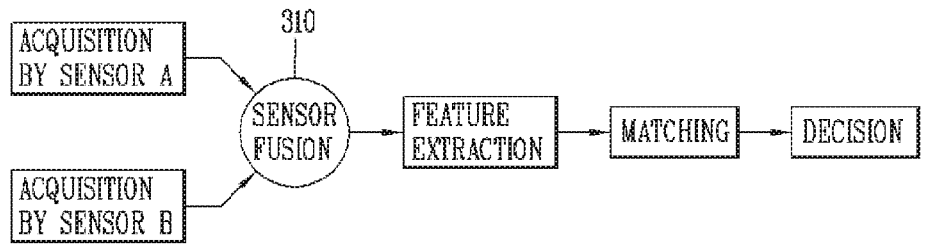
FIGS. 3A to 3D are conceptual views illustrating a multimodal biometric authentication scheme.

FIG. 3A illustrates a sensor fusion scheme 310. The sensor fusion scheme 310 is a scheme for combining multiple pieces of biometric recognition information that are acquired from different sensors in the step of acquiring the biometric recognition information. Specifically, the sensor fusion scheme is a scheme for fusing pieces of biometric recognition information sensed by different biometric sensors and extracting a feature from information that results from the fusion.

Figure 3B:
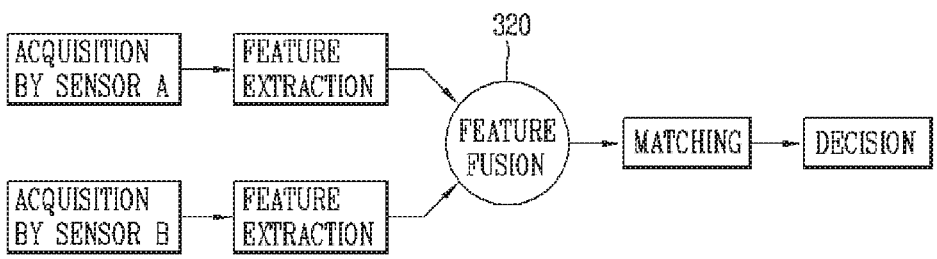

FIG. 3B illustrates a feature fusion scheme 320. The feature fusion scheme 320 is a scheme for extracting a feature from each of the multiple pieces of biometric recognition information acquired from the different biometric sensors in the feature extraction step and combining the extracted features.

Figure 3C:
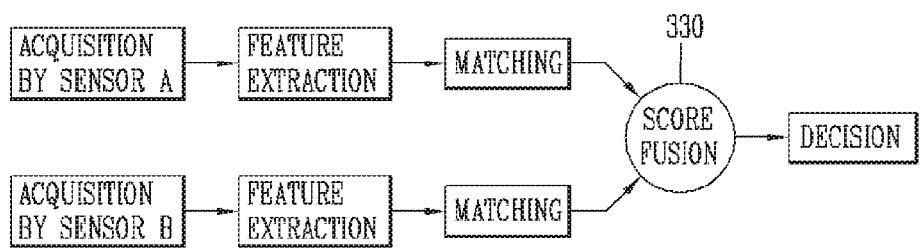

FIG. 3C illustrates a score fusion scheme 330. The score fusion scheme 330 is a scheme for combining matching scores that are calculated for the multiple pieces of biometric recognition information, respectively, in the step of matching pieces of biometric recognition information.

Figure 3D:
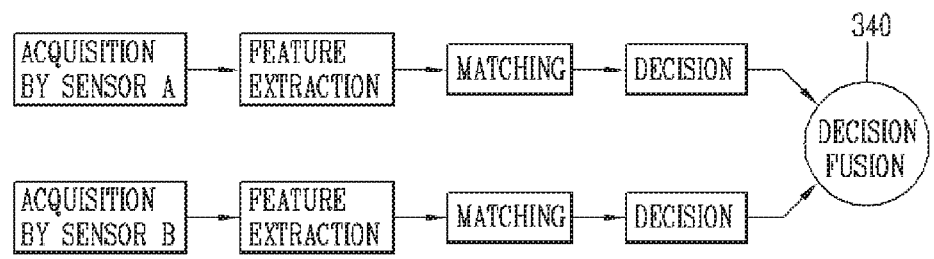

FIG. 3D illustrates a decision fusion scheme 340. The decision fusion scheme 340 is a scheme for combining results of decision that are calculated for the multiple pieces of biometric recognition information, respectively, in the step of deciding the biometric recognition information.

Figure 4A:
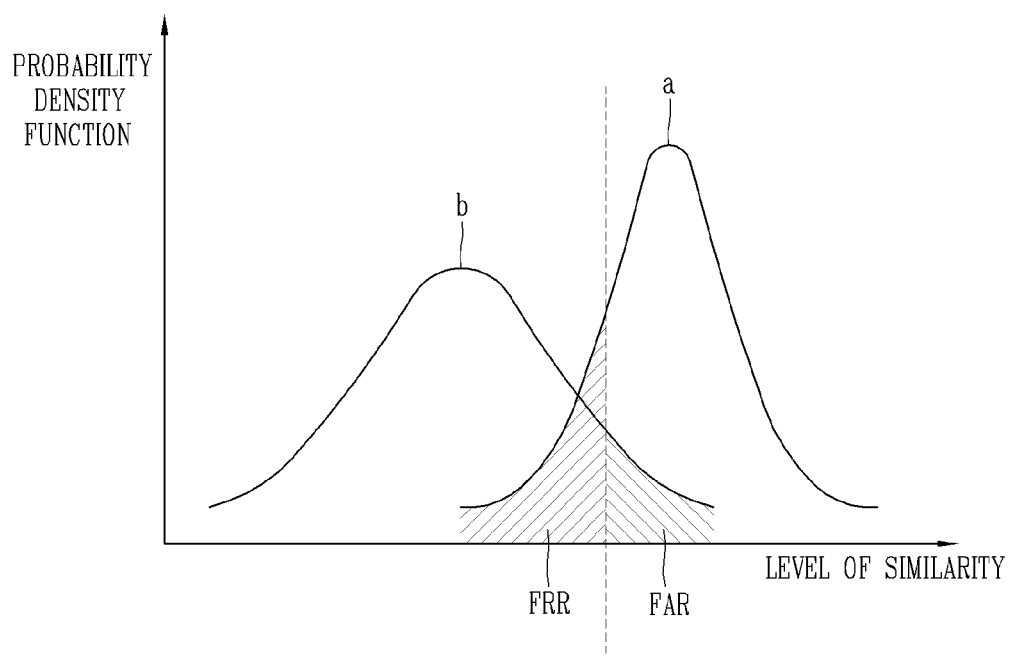
FIGS. 4A and 4B are graphs associated with an error rate of decision of biometric authentication.
Figure 4B:
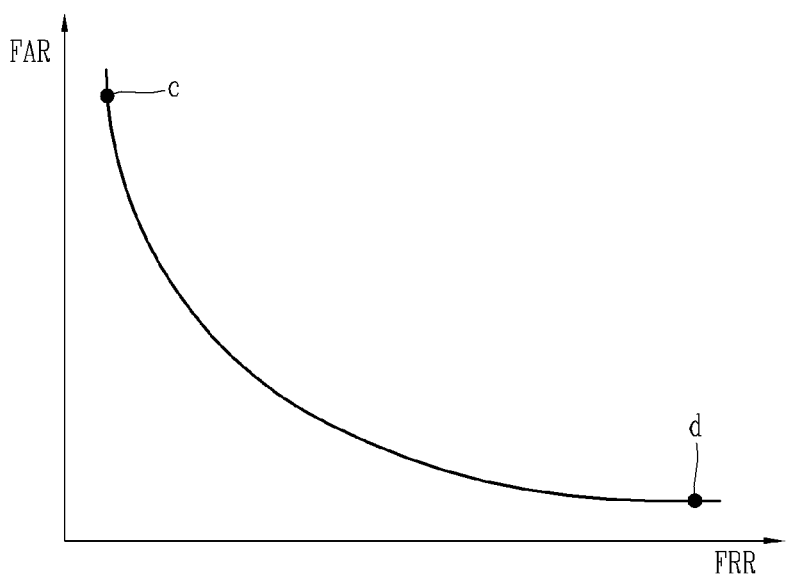

The various schemes for the multimodal biometric authentication have been described above. Hereinafter, an error rate of the biometric recognition associated with the decision function when performing the user authentication through the biometric authentication will be described. FIGS. 4A and 4B are graphs associated with an error rate of decision of biometric authentication.

Graph a in FIG. 4A is a graph illustrating similarity distribution between genuine user's biometric information and the preregistered user information, when performing the biometric authentication. Graph b in FIG. 4A is a graph illustrating similarity distribution between imposter user's biometric information and the preregistered user information.

There is an overlapping portion between Graph a and Graph b. In a case where the similarity is higher than a threshold value indicated by a dot line, the electronic device 100 determines that the user is a genuine user. In a case where the similarity is lower than the threshold value, the electronic device 100 determines that the user is an imposter user. The threshold here may be a value that is decided by a provider that provides the biometric authentication function, and means the decision function described above.

On the other hand, a false rejection rate (FRR) that is illustrated in FIG. 4A refers to a rate at which the genuine user is determined as an imposter user. The higher the FRR, the higher the threshold value. This decreases the probability that the user who inputs the biometric recognition information will be determined as a genuine user. Because of this, the level of security of the biometric authentication may increase. The lower the FRR, the lower the threshold. This increases the probability that the user who inputs the biometric recognition information will be determined as a genuine user. Because of this, the level of security of the biometric authentication may decrease.

A false acceptance rate (FAR) refers to a rate at which the imposter user is determined as a genuine user. The concept of the FAR is opposite to that of the FRR. The higher the FAR, the lower the threshold value. This increases the probability that the user who inputs the biometric recognition information will be determined as a genuine user. Because of this, the level of security of the biometric authentication may decrease.

FIG. 4B is a graph illustrating a relationship between the FRR and the FAR. The FRR and the FAR are inversely proportional to each other. A threshold that corresponds to an area d where the FRR is high and the FAR is low is used for applications that provide a low authentication speed but require a high degree of security. For example, the threshold value that corresponds to this area is set for a payment application and a bank application for strictly determining the genuine user. Conversely, a threshold that corresponds to an area c where the FRR is low and the FAR is high is used for applications that provide a high authentication speed and require a low level of security. For example, the threshold that corresponds to this area is used for an unlocking function and so on. In this manner, a threshold (that is, the decision function) of the biometric authentication function may be decided considering a level of security of each of the functions that are to be performed through the biometric authentication. The parameters relating to the errors that results when performing the biometric authentication have been described above.

Hereinafter, an algorithm that is used for the score fusion scheme that is among the multimodal biometric authentication schemes will be described.

For the score fusion scheme, various artificial intelligence algorithms for combining matching scores are used. Algorithms that are used for the score fusion scheme may include combination-based score fusion algorithms, classifier-based score fusion algorithms, density-based score fusion algorithms, and so on.

The combination-based score fusion algorithms include a statistical rule, dynamic weighting, triangular norms, and so on. The classifier-based score fusion algorithms may include a support vector machine (SVM), AdaBoost (RS-ADA), Dampster-Shafer (DS) and so on. The density-based score fusion algorithms may include a likelihood feature (LF) and so on.

Besides, according to the present disclosure, various algorithms and so on that are known in the related art may be used for the score fusion scheme, and descriptions thereof are omitted in order not to depart from the nature and gist of the present disclosure.

Meanwhile, in the related art, learning has to be carried out by collecting a large amount of data at once in order to determine a reference value for performing multimodal (or complex) biometric authentication. This causes a burden and a cost problem due to the collection of the large amount of data. Accordingly, the present disclosure proposes an electronic device capable of making a decision based on multimodal biometric sensors without carrying out learning.

Figure 5A:
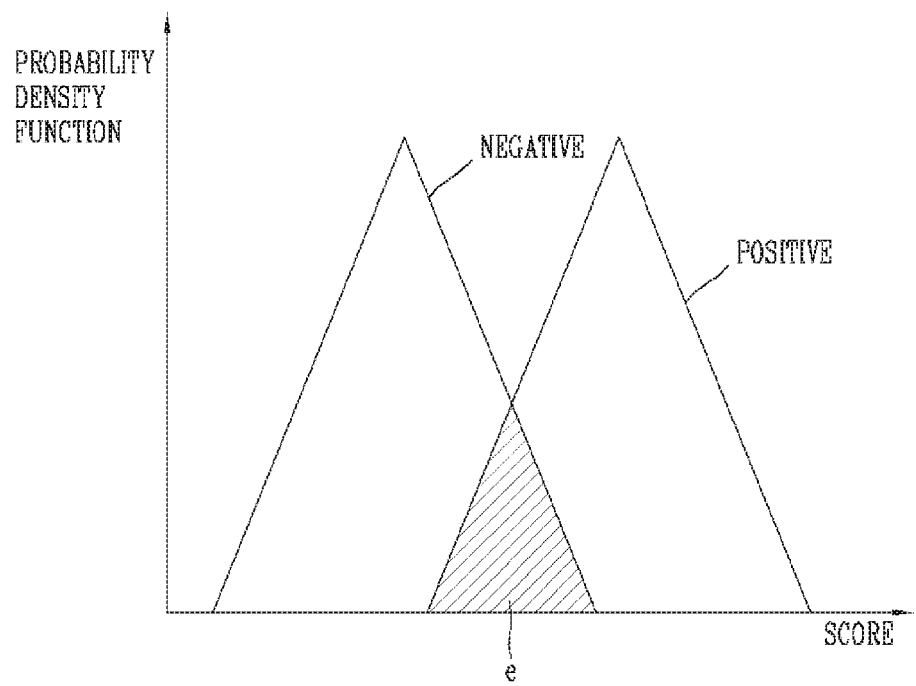
FIGS. 5A and 5B are views illustrating the concepts of a false positive (FP) and a false negative (FN).

In this regard, the graph of FIG. 5A is a graph showing the relationship between the decision scores, which are recognized as positive and negative, and a probability density function, in making a decision for biometric authentication.

In FIG. 5A, there is an overlapping area e between a distribution determined to be positive in the biometric authentication, that is, a distribution determined to be a registered genuine user and a distribution determined to be negative, that is, a distribution determined to be an imposter user.

In this manner, the overlapping area e exists between the positive and negative distributions because there is an overlapping portion in biometric information/behavior profile between the positive and negative distributions, namely, between the genuine user and the imposter user.

Figure 5B:
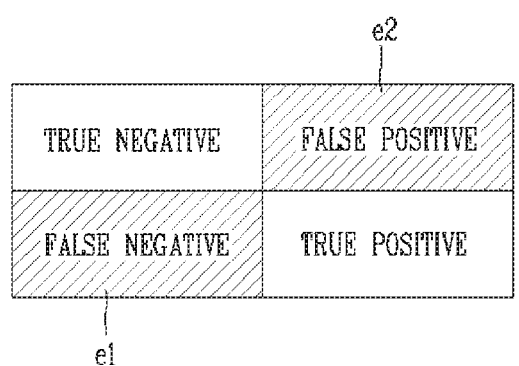

FIG. 5B illustrates a relationship between a false positive (FP) and a false negative (FN) which embody the area e in FIG. 5A.

First, true positive (TP) is a case in which the positive result correctly predicts positive and is "accepted (passed)". In addition, true negative (TN) is a case in which the negative result correctly predicts negative and is "detected (rejected)".

False positive (FP) e2 is a case in which the negative result incorrectly predicts positive, and may be said to be "incorrect detection". Or, it may be said to be false positive. False negative (FN) e1 is a case in which the positive result incorrectly predicts negative, and may be said to be "failed detection". Or, it may be said to be false negative. Thus, the false positive (FP) e2 which is incorrectly detected and the false negative (FN) e1 which is failed to be detected correspond to the overlapping area e of FIG. 5A.

A false positive rate (FPR) means a rate at which the negative result predicts positive. In addition, a false negative rate (FNR) means a rate at which the positive result predicts negative. These FPR and FNR values are related to authentication performance of the biometric sensor. For acquiring the FPR and FNR satisfying the authentication performance, a reference value was determined through learning in the related art.

However, in the present disclosure, a reference value of a final decision function can be set by fixing the FPR/FNR to satisfy desired authentication performance.

Figure 5C:
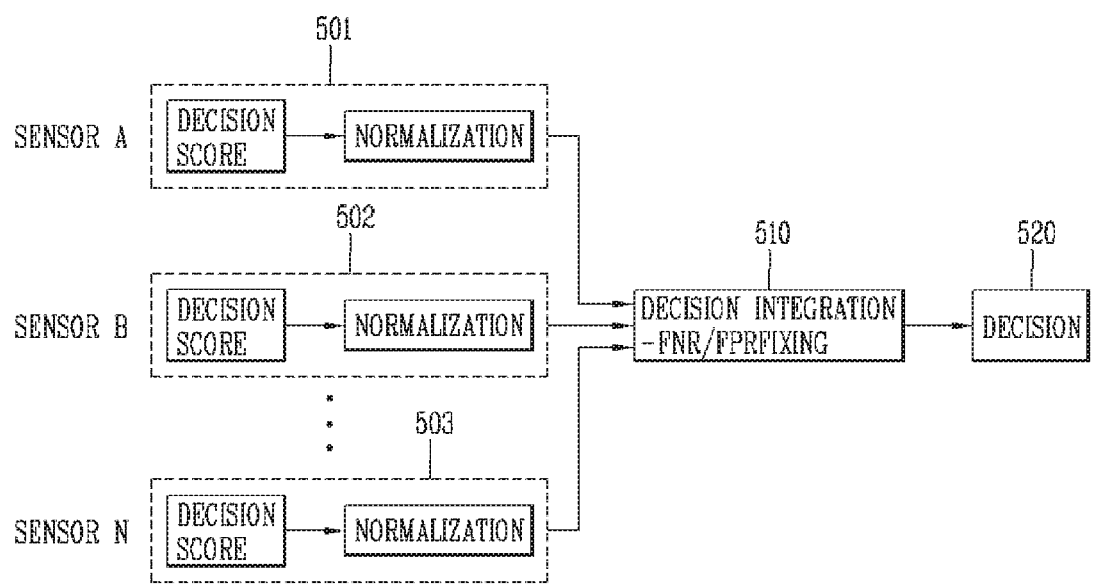
FIG. 5C is a view illustrating a process of performing user authentication with a fixed false positive rate (FPR) or false negative rate (FNR) by normalizing a decision score for each biometric sensor, in an electronic device in accordance with an embodiment of the present disclosure.

FIG. 5C is a view illustrating a process of performing user authentication without learning, by normalizing a decision score for each of biometric sensors, and fixing an FPR/FNR.

Specifically, referring to FIG. 5C, decision scores of a variety of biometric sensors, for example, sensor A, sensor B, . . . , sensor N, are normalized/standardized, respectively, according to predetermined criteria.

Specifically, a decision score for biometric information acquired by the sensor A is normalized/standardized, to generate a normalized A decision score 501. Also, a decision score for biometric information acquired by the sensor B is normalized/standardized, to generate a normalized B decision score 502. In this way, a decision score for biometric information obtained by the sensor N are normalized/standardized, to generate a normalized N decision score 503.

Here, there is no specific limitation on a type of biometric information acquired by the sensors A, B, . . . , N. For example, the biometric information may include various human body-related information, such as face, fingerprint, voice, iris, vein, and the like, which can represent person's unique features.

Meanwhile, the sensors A, B, . . . , N described herein are not limited to sensors for sensing biometric information, unless otherwise contradictory to the present disclosure, and may alternatively include various types of sensors for classifying intrusions into positive/negative by detecting or passing (accepting) the intrusions.

As such, if the decision scores are normalized for each sensor according to the predetermined criteria, decision integration 510 in which the false negative rate (FNR) or the false positive rate (FPR) is fixed can be performed during integrated matching for multimodal biometric authentication.

In the decision integration 510, a decision function model for combined matching of normalized A, B, N decision scores 501, 502, 503 is generated. Here, the decision function model is a function model for deciding a threshold score for determining whether combined matching of multimodal biometric information obtained for user authentication is a genuine user (or an imposter user).

In the present disclosure, the threshold score is changed according to the sensitivity or specificity level of the decision function model generated in decision integration 510. That is, the threshold score of the decision function model is applied differently depending on the sensitivity level desired by the user.

Here, changing the sensitivity or specificity level of the decision function model means controlling the false negative rate (FNR) or the false positive rate (FPR).

For example, if the decision score for the biometric information is normalized based on positive data, the false negative rate (FNR) may be controlled. On the other hand, if the decision score for the biometric information is normalized based on negative data, the false positive rate (FPR) may be controlled.

At this time, controlling the FNR or FPR means selecting a specific FNR or FPR value from among fixed FNR or FPR values which match threshold scores, respectively.

This selection may be determined to be a default value at the time of manufacturing products, or may be set or changed through a user input.

In this manner, the matched threshold score is decided according to the control of the FNR or FPR. Thus, there is no need to perform learning to decide the threshold value for authentication. That is, once a threshold score matching a specific FNR or FPR is decided, the user authentication is finally decided (520) based on the decided threshold score.

Hereinafter, description will be given in detail of a process of normalizing a decision score based on positive data, setting a sensitivity level at a fixed false negative rate (FNR) of a decision function, and performing authentication based on a threshold score varied according to the sensitivity level, with reference to FIGS. 6, 7A, 7B, 7C, 8A, 8B, and 8C and 8D.

To this end, the security module of the electronic device according to the present disclosure may roughly perform normalized decision score acquisition 601, 602, decision integration 610, and final authentication decision 620.

Figure 6:
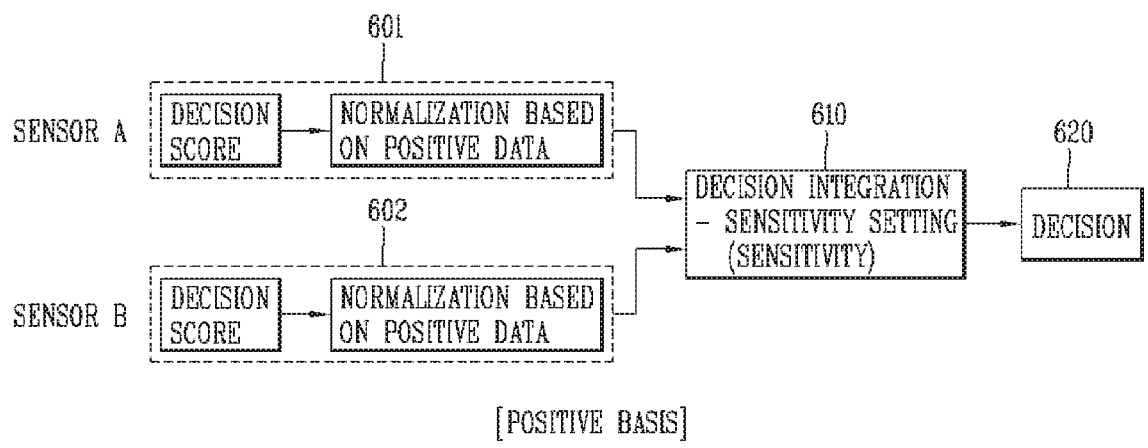
FIGS. 6, 7A, 7B, 7C, 8A, 8B, 8C and 8D are views illustrating a process of normalizing a decision score based on positive data, setting a sensitivity level at a fixed false negative rate (FNR) of a decision function, and performing authentication based on a threshold score varied according to the sensitivity level, in an electronic device in accordance with an embodiment of the present disclosure.

Specifically, referring to FIG. 6, a decision score for biometric information acquired by the sensor A is normalized on the basis of positive data and converted into a normalized A decision score 601.

Also, a decision score for biometric information acquired by the sensor B is normalized on the basis of positive data and converted into a normalized B decision score 602.

In the decision integration 610, a decision function model for combined matching of the normalized A, B decision scores 601, 602 is generated. At this time, a threshold score corresponding to a value selected according to a sensitivity level, that is, the control of the FNR, is applied to the decision function model. The threshold score is set to be varied, in response to the change of the value selected according to the sensitivity level, namely, the control of the FNR.

In the final decision 620, user authentication is performed based on the threshold score corresponding to the value selected according to the control of the FNR.

On the other hand, the controller of the electronic device may control the operations of the electronic device based on the result of the user authentication by the final decision 620.

Figure 7A:
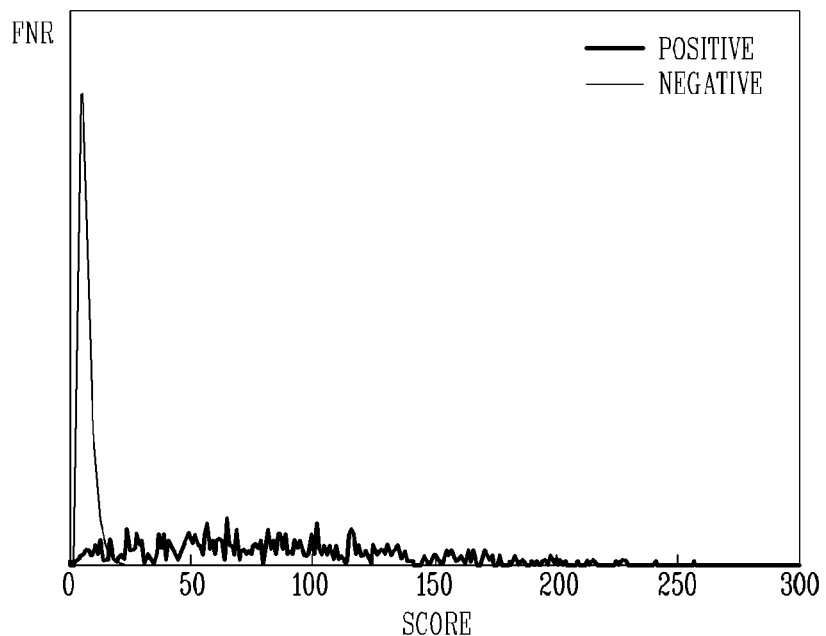
Figure 7B:
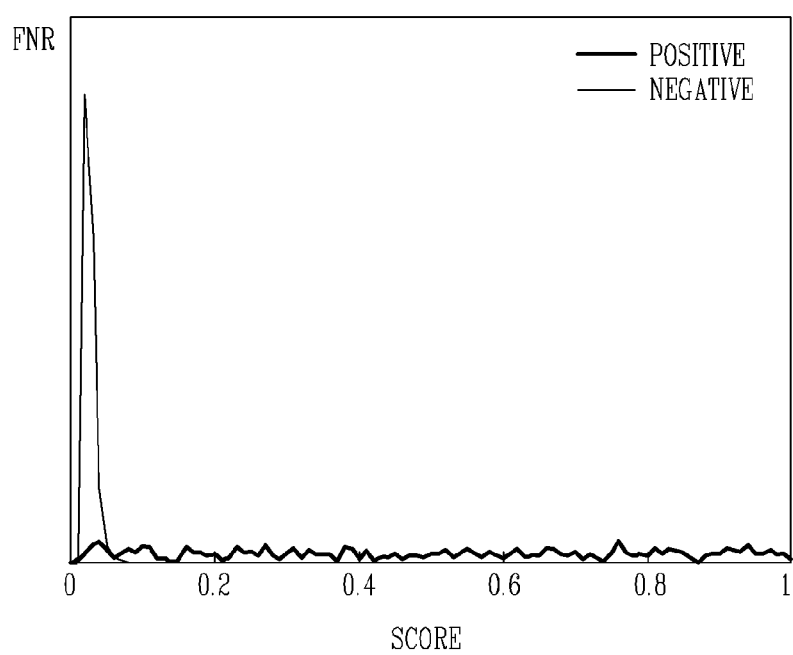
Figure 7C:
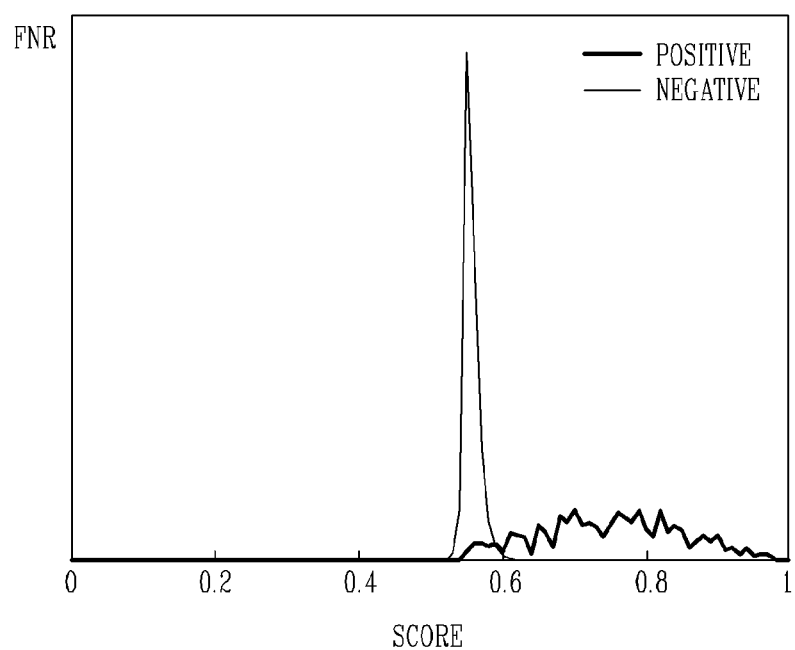

FIGS. 7A to 7C illustrate a detailed example of a process of normalizing decision scores. Normalization of decision scores based on positive data may be performed by applying generalized extreme value (GEV) parameters and Gaussian distributions to the positive data.

Referring to FIG. 7A, decision scores for each of sensors are fitted to the GEV distribution based on positive data. To this end, a function of the following Equation 1 may be used. In this regard, x, a, k, and z denotes a random variable, scale parameter, standardized variable and shape parameter of the GEV distribution, respectively.

[Equation 1]

$$f(x) = \begin{cases} \frac{1}{\sigma} \exp(-(1+kz)^{-1/k})(1+kz)^{-1-1/k} & k \neq 0 \\ \frac{1}{\sigma} \exp(-z - \exp(-z)) & k = 0 \end{cases}$$ [Equation 1]

Next, referring to FIG. 7B, the decision scores for each of sensors are normalized/standardized into uniform distribution by using GEV parameters. Accordingly, the decision scores of the positive data are uniformly distributed as the same value in a section from 0 to 1. In this case, the following Equation 2 may be applied. In this regard, y, μ, σ, and ζ denotes a random variable, mean, standard deviation, and shape parameter of the Gaussian distribution, respectively.

$$F(y, \mu, \sigma, \xi) = \exp\left[-\left(1 + \xi\left(\frac{y-\mu}{\sigma}\right)\right)^{\frac{1}{\xi}}\right], \xi \neq 0$$ [Equation 2]

$$F(y, \mu, \sigma, \xi) = \exp\left[-\exp\left(-\frac{y-\mu}{\sigma}\right)\right], \xi = 0$$

Thereafter, as illustrated in FIG. 7C, the decision scores each of the sensors are normalized/standardized by converting uniform distribution into Gaussian distribution using an inverse error function defined as the inverse of an error function.

This may be performed using the following Equation 3. In this regard, x denotes a random variable of the GEV distribution.

Equation [3]

$$\operatorname{erf}^{-1}(x) = \sum_{k=0}^{\infty} \frac{c_k}{2k+1}\left(\frac{\sqrt{\pi}}{2}x\right)^{2k+1}$$ [Equation 3]

$$\text{where } c_0 = 1 \wedge c_k = \sum_{m=0}^{k-1} \frac{c_m c_{k-1-m}}{(m+1)(2m+1)}$$

Thus, when the decision scores are normalized for sensors on the basis of the positive data, they obtain the FNR in response to the generation of the decision function model.

Figure 8A:
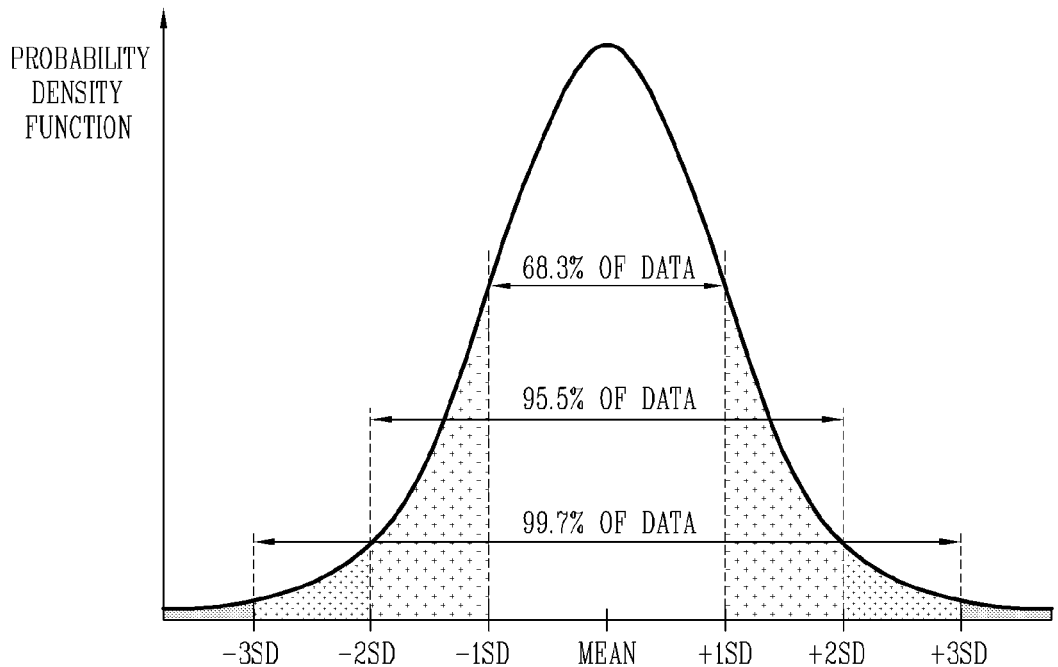

FIG. 8A shows a distribution graph of a fixed FNR. About 68.3% of data is distributed when a deviation sd is ±1 based on an average value/intermediate value (mean). For example, about 95.5% of data is distributed when the deviation sd is ±2 based on the average value/intermediate value (mean). About 99.7% of data is distributed when the deviation sd is ±3 based on the average value/intermediate value.

Larger deviations make authentication easier but less secure. On the other hand, smaller deviations make authentication more secure but take a longer time for authentication.

Figure 8B:
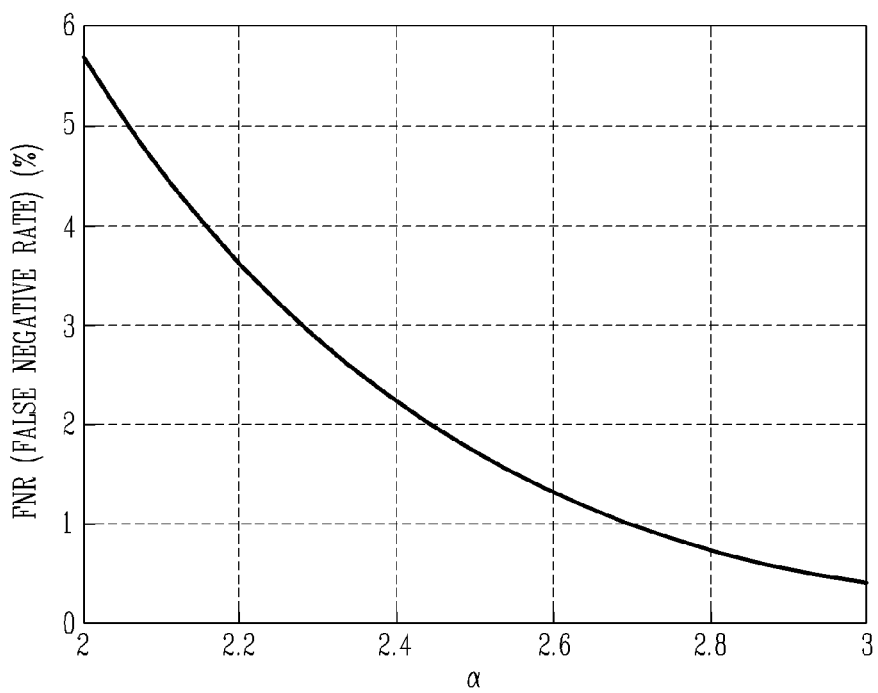

In any case, if the decision function has a fixed FNR, a threshold score a can be decided, without learning, by way of selecting a control value of a desired FNR in the graph of FIG. 8B.

Figure 8C:
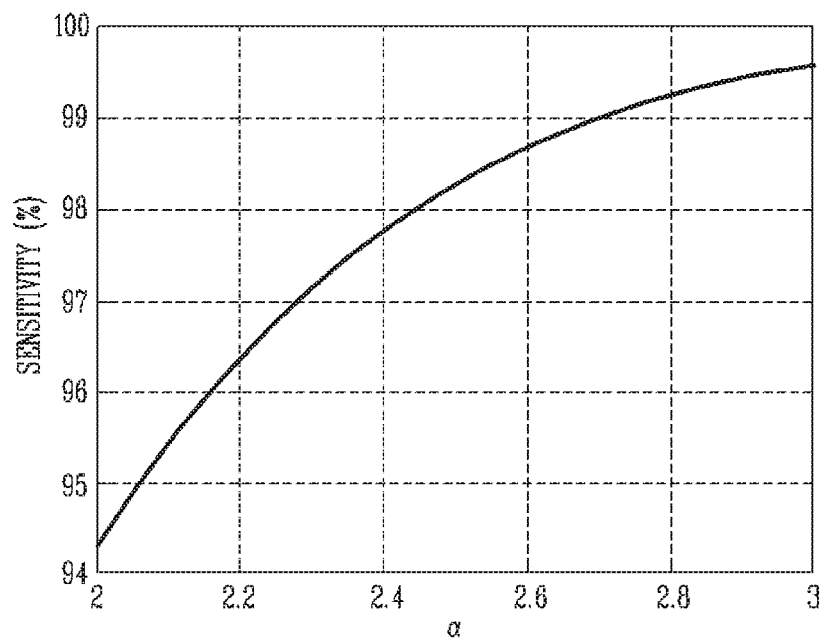

FIG. 8C shows the conversion of the control of the FNR into a threshold score a relative to sensitivity (sensitivity level).

For example, if the control value of the FNR is selected in the range of 1.3% to 1.4% in FIG. 8B or the sensitivity level is selected in the range of 98.6% to 98.8% in FIG. 8C, the threshold score is set to about 2.6.

As such, the security module of the electronic device according to the present disclosure can select a sensitivity level by controlling the fixed FNR and decide a parameter corresponding to the selected sensitivity level as a threshold score of a decision function model, upon user authentication.

To this end, the security module of the electronic device stores in advance parameters of threshold scores for each of the sensitivity levels selected from the fixed FNR. At the time of authentication, a parameter corresponding to a specific sensitivity level is extracted from the stored parameters and automatically applied as a threshold score.

Figure 8D:
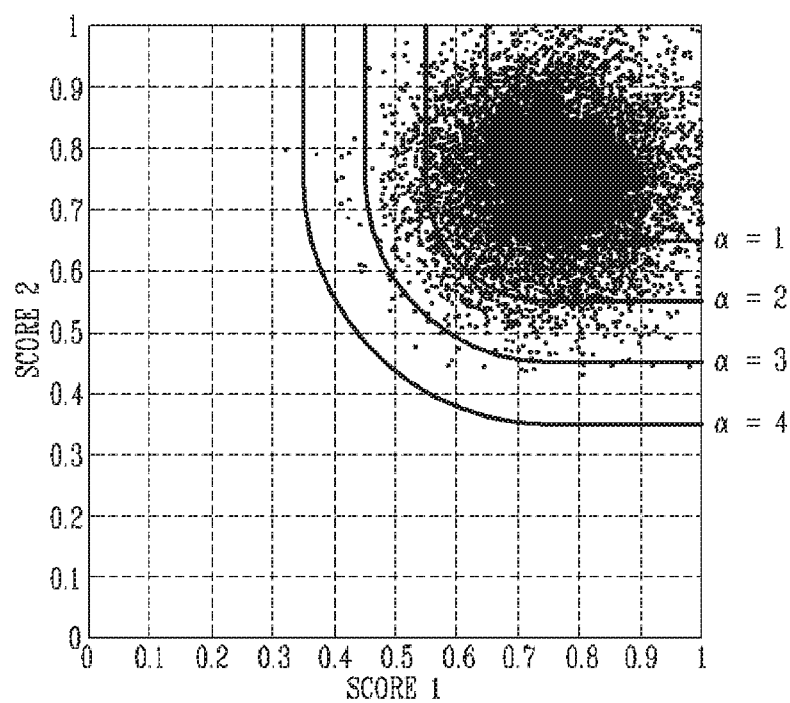

FIG. 8D shows a threshold score for performing combined matching of decision scores of multimodal biometric information normalized on the basis of positive data. According to the example described above with reference to FIGS. 8B and 8C, α=2.6 is applied. Accordingly, a virtual line is formed in parallel between α=2 and α=3 in FIG. 8D.

Identification data located at lower and left sides of the virtual line (not shown) of α=2.6 is identified as an imposter (or detected). And, identification data located at upper and right sides of the graph based on the virtual line (not shown) of α=2.6 is identified as a genuine user (or passed). The following Equation 4 shows values of score 1 (s1) and score 2 (s2) which vary according to the value a.

[Equation 4]

$$(s_1-0.75)^2+(s_2-0.75)^2=(\alpha\cdot 0.1)^2,$$

where $s_1<0.75$ and $s_2<0.75$ $$s_1=0.75-\alpha\cdot 0.1, \text{ where } s_2\geq 0.75,$$

$$s_2=0.75-\alpha\cdot 0.1, \text{ where } s_1\geq 0.75,$$

As described above, the decision function model generated according to the present disclosure is a model for deciding a threshold score to determine whether or not a combined matching result of first and second biometric information acquired for user authentication is a genuine user.

At this time, the threshold score varies depending on a sensitivity level selected in the decision function model. For example, upon an increase in the sensitivity level, a parameter value which matches a threshold score is increased. As a result, security becomes higher. Also, for example, upon a decrease in the sensitivity level, the parameter value which matches the threshold score is also decreased. Accordingly, fast authentication can be performed.

In one embodiment, the parameter for deciding the threshold score may be actively varied based on cumulative information of the first and second biometric information.

Figure 11A:
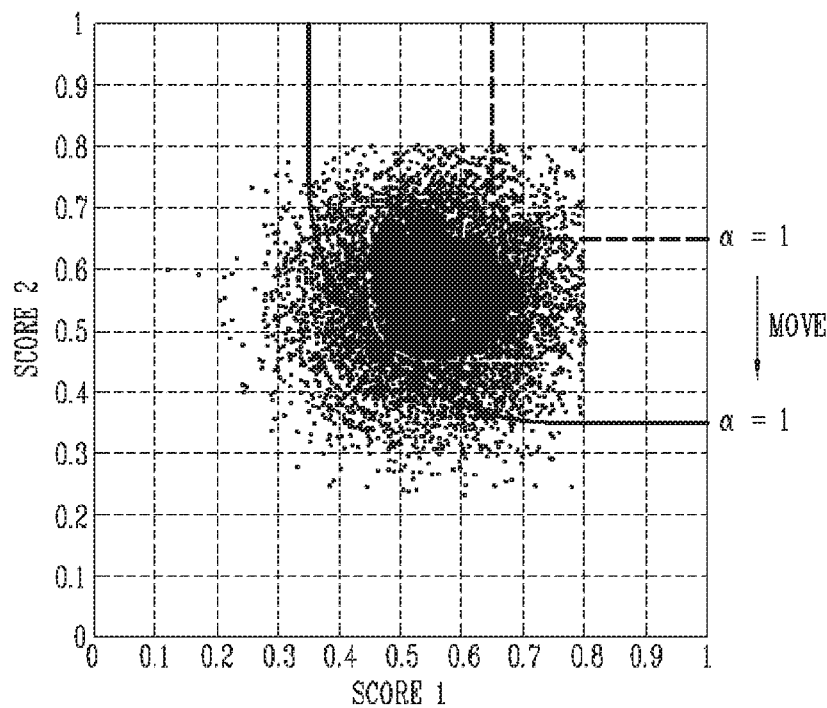
FIGS. 11A and 11B are views illustrating that parameters of a threshold score are actively varied based on cumulative information of biometric information, in an electronic device according to an embodiment of the present disclosure.

In this regard, referring to FIG. 11A, as the number of times of user authentication is increased by the electronic device, an absolute value of parameters for deciding a threshold score may be changed or its position may be moved down, based on cumulative information of the input biometric information. This corresponds to an update in the electronic device, and thus there is no cost burden caused due to learning based on analysis of a large volume of data.

Hereinafter, description will be given in detail of a process of normalizing a decision score based on negative data, setting a specificity level at a fixed false positive rate (FPR) of a decision function, and performing authentication based on a threshold score varied according to the specificity level, in an electronic device according to an embodiment of the present disclosure, with reference to FIGS. 9, 10A, 10B and 10C.

Figure 9:
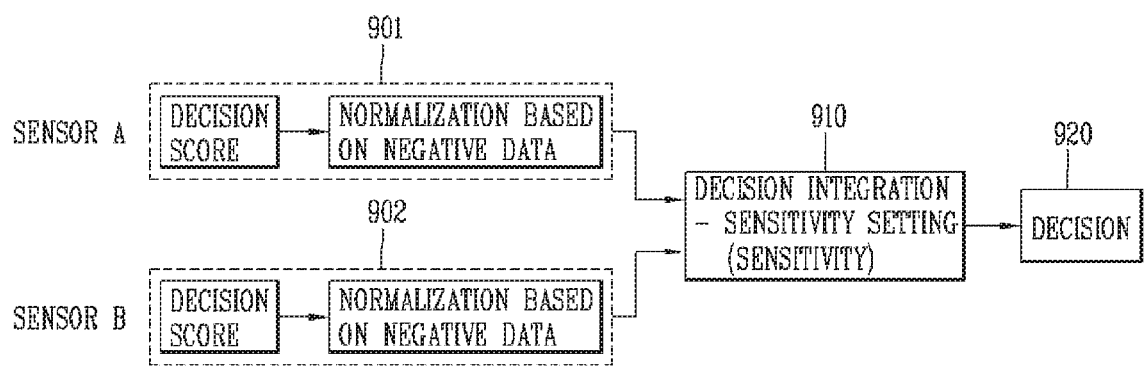
FIGS. 9, 10A, 10B and 10C are views illustrating a process of normalizing a decision score based on negative data, setting a specificity level at a fixed false positive rate (FPR) of a decision function, and performing authentication based on a threshold score varied according to the specificity level, in an electronic device according to an embodiment of the present disclosure.

First, referring to FIG. 9, a decision score for biometric information acquired by the sensor A is normalized on the basis of negative data and converted into a normalized A decision score 901.

Also, a decision score for biometric information acquired by the sensor B is normalized on the basis of negative data and converted into a normalized B decision score 902.

In the decision integration 910, a decision function model for combined matching of the normalized A, B decision scores 901, 902 is generated. At this time, a threshold score corresponding to a value selected according to a specificity level, that is, the control of the false positive rate (FPR), is applied to the decision function model.

The threshold score is set to be varied, in response to the change of the value selected according to the specificity level, namely, the control of the FPR.

In the final decision 920, user authentication, for example, determination as to whether a user is a genuine or imposter is performed based on the threshold score corresponding to the value selected according to the control of the FPR. The controller of the electronic device may control the operations of the electronic device based on the result of the user authentication by the final decision 920.

Figure 10A:
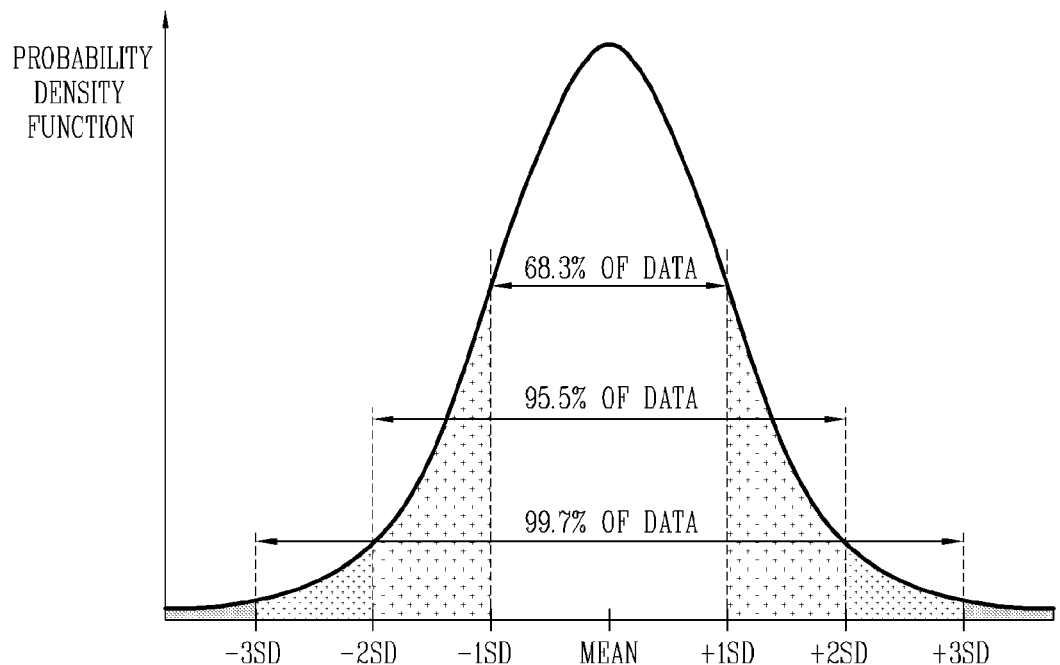

FIG. 10A shows a graph of a distribution of a fixed FPR of a decision function for a decision score normalized on the basis of negative data. Similar to FIG. 8A, about 68.3% of data is distributed when a deviation sd is ±1 based on an average value/intermediate value (mean). For example, about 95.5% of data is distributed when the deviation sd is ±2 based on the average value/intermediate value (mean). About 99.7% of data is distributed when the deviation sd is ±3 based on the average value/intermediate value.

Larger deviations make authentication easier but less secure. On the other hand, smaller deviations make authentication more secure but take a longer time for authentication.

Figure 10B:
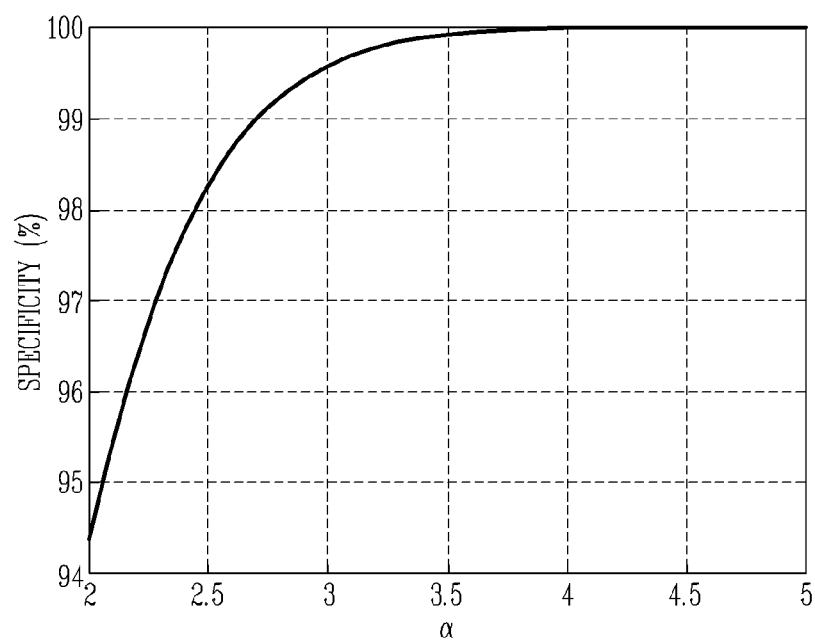

In any case, if the decision function has a fixed FPR, a threshold score a can be decided, without learning, by way of selecting a value of a specificity level corresponding to a control value of a desired FPR in the graph of FIG. 10B.

For example, if the specificity level is selected in the range of 98.2% to 98.4% in FIG. 10B, the threshold score may be automatically decided as about 2.5.

As such, the security module of the electronic device according to the present disclosure can select a specificity level by controlling the fixed FPR and decide a parameter corresponding to the selected specificity level as a threshold score of a decision function model, upon user authentication.

To this end, the security module of the electronic device stores in advance parameters of the threshold scores for specificity levels, respectively. At the time of authentication, a parameter corresponding to a specific specificity level is extracted from the stored parameters and automatically applied as a threshold score.

Figure 10C:
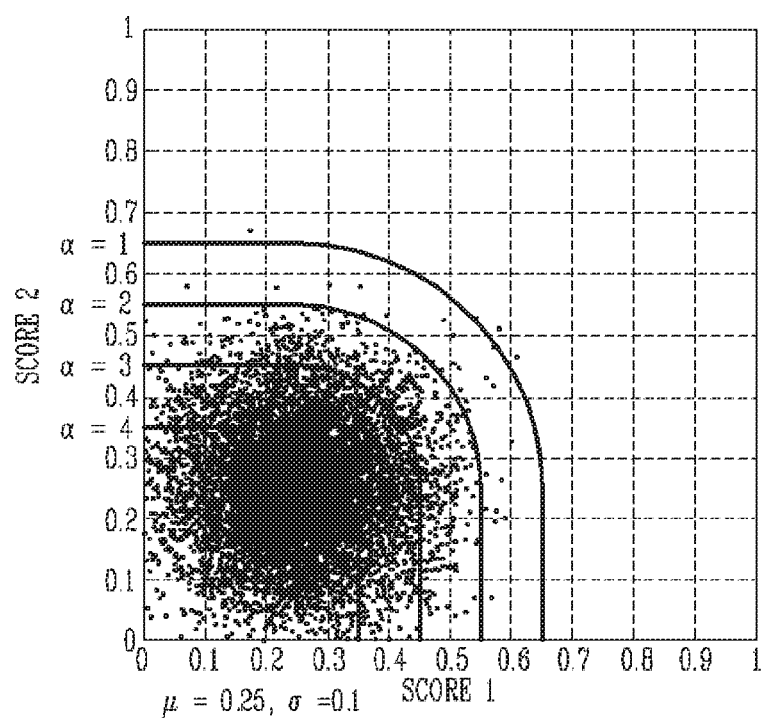

FIG. 10C shows a threshold score for performing combined matching of decision scores of multimodal biometric information normalized on the basis of negative data. According to the example described above with reference to FIG. 10C, α=2.5 is applied. Accordingly, a virtual line is formed in parallel between α=2 and α=3 in FIG. 10C. In this regard, μ, and σ denotes a mean, standard deviation of the distribution of FIG. 10A.

Identification data located at lower and left sides of the virtual line (not shown) of α [[a]]=2.5 is identified as an imposter (or detected). And, identification data located at upper and right sides of the graph based on the virtual line (not shown) of α=2.5 is not identified as an impostor, namely, identified as a genuine user (or passed). The following Equation 5 shows values of score 1 (s1) and score 2 (s2) which vary according to the value a.

[Equation 5]

$$(s_1-0.25)^2+(s_2-0.25)^2=(\alpha\cdot 0.1)^2,$$

where $s_1>0.25$ and $s_2>0.25$ $$s_1=0.25+\alpha\cdot 0.1, \text{ where } s_2\leq 0.75,$$

$$s_2=0.25+\alpha\cdot 0.1, \text{ where } s_1\leq 0.75,$$

In one embodiment, the parameter for deciding the threshold score may be actively varied based on cumulative information of the first and second biometric information.

Figure 11B:
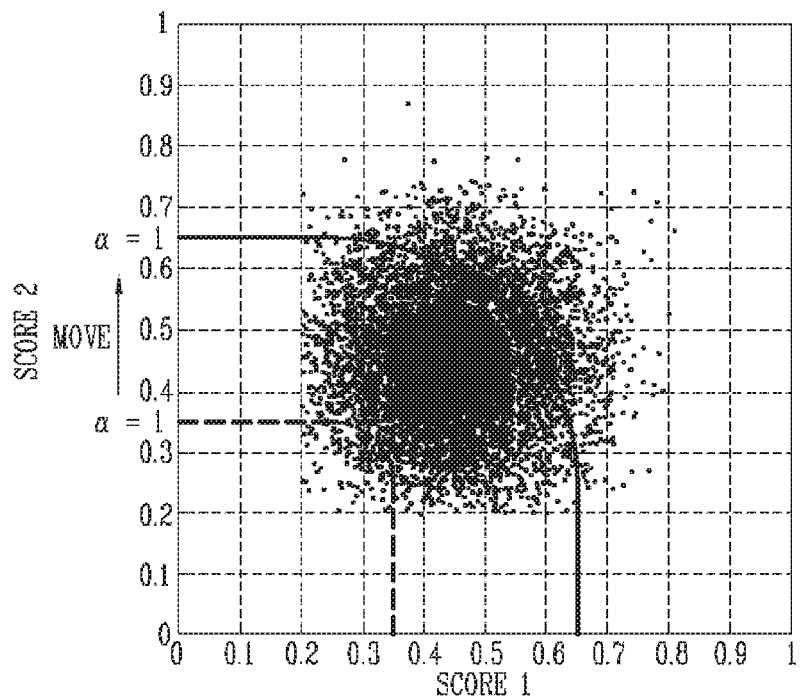

In this regard, referring to FIG. 11B, as the number of times of user authentication is increased by the electronic device, an absolute value of parameters for deciding a threshold score may be changed or its position may be moved up, based on cumulative information of the input biometric information. This corresponds to an update in the electronic device, and thus there is no cost burden due to learning based on analysis of a large volume of data.

On the other hand, in one embodiment, the security module of the electronic device according to the present disclosure may further include a third biometric sensor configured to sense third biometric information, so as to normalize a third decision score for the third biometric information on the basis of negative data. The normalized third decision score is combined with a decision function model for combined matching of the normalized first and second decision scores, and then is applied. Even if a large number of sensors are added or changed, complexity is not increased.

In the present disclosure, the performance of the user authentication can be evaluated by applying the threshold score which varies depending on the control of the fixed FPR or the fixed FNR.

As described above, the electronic device according to the present disclosure can normalize each decision score of a multimodal biometric sensor on the basis of positive or negative data, thereby deciding a threshold score of a decision function according to sensitivity/specificity. That is, decision based on the multimodal biometric sensor can be made, even without learning. In addition, the process of collecting a large amount of data for learning at once in order to decide a reference value for the multimodal biometric authentication is eliminated, thereby reducing a cost. This may result in further enhancement of usability. Also, even if another biometric sensor is added, biometric information acquired by the added sensor can be normalized and fast reflected to a final decision. In addition, since the desired performance can be evaluated in terms of fixed sensitivity/specificity at the time of the multimodal biometric authentication, trade-off can be facilitated.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the electronic device. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic device for performing multimodal biometric authentication, the electronic device comprising:
a first biometric sensor configured to detect first biometric information;
a second biometric sensor configured to detect second biometric information;
a security chip coupled to the first biometric sensor and second biometric sensor and configured to:
normalize a first decision score for the first biometric information and a second decision score for the second biometric information based on positive data,
generate a decision function model for combined matching of the normalized first and second decision scores,
set a threshold score corresponding to a sensitivity level in the decision function model, and
perform user authentication for the first and second biometric information based on the decision function model to which the threshold score is applied; and
a controller configured to control an operation of the electronic device based on a result of the user authentication performed by the security chip,
wherein the threshold score varies depending on a change of the sensitivity level, and wherein the normalization of the first decision score and the second decision score is performed based on the positive data by applying a generalized extreme value (GEV) parameter and a Gaussian distribution to the positive data.

2. The electronic device of claim 1, wherein a fixed false negative rate (FNR) is output in response to the generation of the decision function model.

3. The electronic device of claim 2, wherein the security chip is configured to: select the sensitivity level by controlling the fixed false negative rate (FNR) and decide a parameter corresponding to the selected sensitivity level as the threshold score of the decision function model at a time of the user authentication.

4. The electronic device of claim 2, wherein the security chip is configured to:
store parameters of threshold scores for each sensitivity level, selected from the fixed false negative rate (FNR), and
extract a parameter corresponding to a specific sensitivity level from the stored parameters and applies the extracted parameter as a threshold score at a time of the user authentication.

5. The electronic device of claim 2, wherein the decision function model is a model for deciding a threshold score to determine whether or not the combined matching result of the first and second biometric information acquired for the user authentication is a genuine user,
the threshold score is changed according to a sensitivity level selected from the decision function model, and
a parameter for deciding the threshold score is actively varied depending on cumulative information of the first and second biometric information.

6. The electronic device of claim 2, wherein a parameter value that matches the threshold score is increased when the sensitivity level is increased.

7. An electronic device for performing multimodal biometric authentication, the electronic device comprising:
a first biometric sensor configured to detect first biometric information;
a second biometric sensor configured to detect second biometric information;
a security chip coupled to the first biometric sensor and second biometric sensor and configured to:

normalize a first decision score for the first biometric information and a second decision score for the second biometric information based on positive data and negative data, generate a decision function model for combined matching of the normalized first and second decision scores, set a threshold score corresponding to a specificity level in the decision function model, and perform user authentication for the first and second biometric information based on the decision function model to which the threshold score is applied; and a controller configured to control an operation of the electronic device based on a result of the user authentication performed by the security chip, wherein the threshold score varies depending on a change of the specificity level, wherein the normalization of the first and second decision scores is performed based on the positive data by applying a generalized extreme value (GEV) parameter and a Gaussian distribution to the positive data.

8. The electronic device of claim 7, wherein a fixed false positive rate (FPR) is output in response to the generation of the decision function model, and the security chip is further configured to:

select a specificity level by controlling the false positive rate (FPR), and decide a parameter corresponding to the selected specificity level as the threshold score of the decision function model at a time of the user authentication.

9. The electronic device of claim 7, wherein the security chip is configured to:

store parameters of threshold scores for each sensitivity level, selected from a fixed false positive rate (FPR), and extract a parameter value corresponding to a specific specificity level from the stored parameters to apply the extracted parameter as a threshold score at a time of the user authentication.

10. The electronic device of claim 7, wherein the decision function model is a model for deciding a threshold score to determine whether or not a result of the combined matching of the first and second biometric information acquired for the user authentication is an impostor user, the threshold score is changed according to a specificity level selected from the decision function model, and a parameter for deciding the threshold score is actively varied depending on cumulative information of the first and second biometric information.

11. The electronic device of claim 7, wherein the security chip is configured to normalize a third decision score for third biometric information based on the negative data when a third biometric sensor to detect the third biometric information is added, and the normalized third decision score is combined with the decision function model for the combined matching of the normalized first and second decision scores, and then is applied.

12. A method for operating an electronic device that performs multimodal biometric authentication, the method comprising:

normalizing a first decision score for first biometric information acquired by a first biometric sensor based on positive data;

normalizing a second decision score for second biometric information acquired by a second biometric sensor based on the positive data;

generating a decision function model for combined matching of the first and second decision scores normalized based on the positive data, and setting a threshold score by controlling a fixed false negative rate (FNR) in the decision function model; and performing user authentication for the first and second biometric information based on the decision function model to which the set threshold score is applied, wherein the normalization of the first and second decision scores is performed based on the positive data by applying a generalized extreme value (GEV) parameter and a Gaussian distribution to the positive data.

13. The method of claim 12, further comprising evaluating performance of the user authentication by applying a threshold score varied depending on the control of the false negative rate (FNR).

* * * * *